(12) United States Patent
Apostolo et al.

(10) Patent No.: US 9,260,543 B2
(45) Date of Patent: Feb. 16, 2016

(54) METHOD FOR MANUFACTURING FLUOROELASTOMERS

(75) Inventors: Marco Apostolo, Bellinzago (IT); Riccardo Pieri, Milan (IT); Liubov Chernysheva, Caronno Pertusella (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 452 days.

(21) Appl. No.: 13/516,118

(22) PCT Filed: Dec. 16, 2010

(86) PCT No.: PCT/EP2010/069964
§ 371 (c)(1),
(2), (4) Date: Jun. 14, 2012

(87) PCT Pub. No.: WO2011/073344
PCT Pub. Date: Jun. 23, 2011

(65) Prior Publication Data
US 2012/0252970 A1 Oct. 4, 2012

(30) Foreign Application Priority Data

Dec. 18, 2009 (EP) .................................. 09180009

(51) Int. Cl.
C08F 14/18 (2006.01)
(52) U.S. Cl.
CPC ....................................... C08F 14/18 (2013.01)
(58) Field of Classification Search
CPC ............................................................ C08F 2/26
See application file for complete search history.

(56) References Cited

U.S. PATENT DOCUMENTS

| | | |
|---|---|---|
| 3,752,787 A | 8/1973 | De Brunner |
| 3,876,654 A | 4/1975 | Pattison |
| 4,035,565 A | 7/1977 | Apotheker et al. |
| 4,233,427 A | 11/1980 | Bargain et al. |
| 4,243,770 A | 1/1981 | Tatemoto et al. |
| 4,259,463 A | 3/1981 | Moggi et al. |
| 4,281,092 A | 7/1981 | Breazeale |
| 4,394,489 A | 7/1983 | Aufdermarsh |
| 4,558,141 A | 12/1985 | Squire |
| 4,564,662 A | 1/1986 | Albin |
| 4,694,045 A | 9/1987 | Moore |
| 4,745,165 A | 5/1988 | Arcella et al. |
| 4,943,622 A | 7/1990 | Naraki et al. |
| 4,990,283 A | 2/1991 | Visca et al. |
| 5,173,553 A | 12/1992 | Albano et al. |
| 5,285,002 A | 2/1994 | Grootaert |
| 5,447,993 A | 9/1995 | Logothetis |
| 5,495,028 A | 2/1996 | Navarrini et al. |
| 5,656,201 A | 8/1997 | Visca et al. |
| 5,670,088 A | 9/1997 | Chittofrati et al. |
| 5,698,138 A | 12/1997 | Visca et al. |
| 5,725,802 A | 3/1998 | Chittofrati et al. |
| 5,767,204 A | 6/1998 | Iwa et al. |
| 5,789,489 A | 8/1998 | Coughlin et al. |
| 5,789,509 A | 8/1998 | Schmiegel |
| 6,114,452 A * | 9/2000 | Schmiegel ................... 525/194 |
| 2010/0029878 A1 | 2/2010 | Matsuoka et al. |

FOREIGN PATENT DOCUMENTS

| | | |
|---|---|---|
| EP | 120462 B1 | 10/1984 |
| EP | 136596 B1 | 5/1988 |
| EP | 199138 B1 | 2/1989 |

(Continued)

OTHER PUBLICATIONS

Standard ASTM D3418-08, "Standard Test Method for Transition Temperatures and Enthalpies of Fusion and Crystallization of Polymers by Differential Scanning Calorimetry", 2008, A01310181 May 25, 2012, p. 1-7; 7 pgs.

*Primary Examiner* — Nicole M Buie-Hatcher

(57) ABSTRACT

A process for manufacturing a (per)fluoroelastomer having a heat of fusion of less than 5 J/g as measured by ASTM D-3418-08, comprising polymerizing at least one fluorinated monomer in the presence of at least one initiator in a polymerization medium comprising:

(A) water; (B) at least one fluorinated surfactant [surfactant (FS)] having formula (I) here below, wherein:
  $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms,
  $R_F$ represents a divalent perfluorinated $C_1$-$C_3$ bridging group,
  L represents a bond or a divalent group and
  Y represents a hydrophilic functionality selected from anionic functionalities, cationic functionalities and non-ionic functionalities;
(C) at least one fluorinated compound [compound (F)] different from surfactant (FS);
wherein said polymerization medium has a pH value of less than 7.

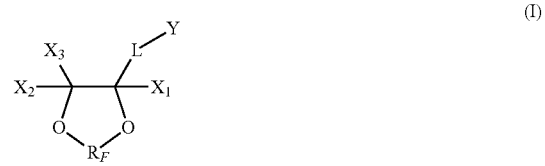

(I)

11 Claims, 1 Drawing Sheet

(56) References Cited

FOREIGN PATENT DOCUMENTS

| | | |
|---|---|---|
| EP | 182299 B1 | 4/1991 |
| EP | 335705 B1 | 1/1994 |
| EP | 410351 B1 | 12/1994 |
| EP | 708797 B1 | 2/1998 |
| EP | 769520 B1 | 7/2002 |
| EP | 860436 B1 | 5/2004 |
| EP | 684277 B1 | 4/2006 |
| EP | 1845117 A1 | 10/2007 |
| EP | 2058291 A1 | 5/2009 |
| EP | 2143738 A1 | 1/2010 |
| JP | 2006321797 A | 11/2006 |
| JP | 2007283224 A | 11/2007 |
| WO | WO 2008132959 A1 | 11/2008 |
| WO | WO 2010003929 A1 | 1/2010 |

* cited by examiner

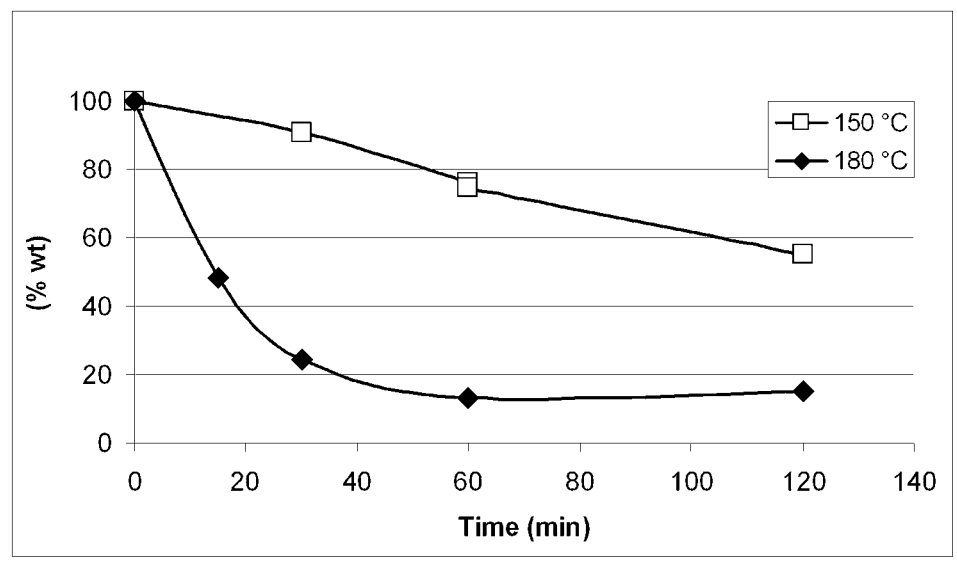

METHOD FOR MANUFACTURING FLUOROELASTOMERS

CROSS-REFERENCE TO RELATED APPLICATIONS

This application is a U.S. national stage entry under 35 U.S.C. §371 of International Application No. PCT/EP2010/069964 filed Dec. 16, 2010, which claims priority to European application No. 09180009.4 filed Dec. 18, 2009, the whole content of this application being incorporated herein by reference for all purposes.

TECHNICAL FIELD

The invention pertains to a method for manufacturing a (per)fluoroelastomer, to (per)fluoroelastomers therefrom and to polymerization media useful in said method.

BACKGROUND ART

Vulcanized (per)fluoroelastomers have been used in a variety of applications, in particular for manufacturing sealing articles such as oil seals, gaskets, shaft seals and O-rings, because of several desirable properties such as heat resistance, chemical resistance, weatherability, etc.

A frequently used method for manufacturing (per)fluoropolymers, in particular (per)fluoroelastomers, involves aqueous emulsion polymerization of one or more fluorinated monomers generally in the presence of fluorinated surfactants. Frequently used fluorinated surfactants include perfluorooctanoic acids and salts thereof, in particular ammonium perfluorooctanoic acid.

Recently, perfluoroalkanoic acids having eight or more than eight carbon atoms have raised environmental concerns. Accordingly, efforts are now devoted to phase out from such compounds and methods have been developed to manufacture (per)fluoropolymer products by aqueous polymerization procedures using alternative surfactants having a more favourable toxicological profile.

For instance, WO 2010/003929 (SOLVAY SOLEXIS S.P.A.) Jan. 14, 2010 discloses a process for the manufacture of a fluoropolymer by aqueous emulsion polymerization of one or more fluorinated monomers in the presence of at least one cyclic fluorocompound having formula (I) here below:

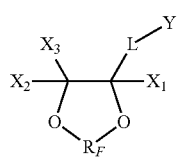

(I)

wherein:
X$_1$, X$_2$ and X$_3$, equal to or different from each other, are independently selected from H, F and C$_1$-C$_6$ (per)fluoroalkyl groups, optionally comprising one or more catenary or non-catenary oxygen atoms,
R$_F$ represents a divalent fluorinated C$_1$-C$_3$ bridging group,
L represents a bond or a divalent group, and
Y represents a hydrophilic functionality selected from anionic functionalities, cationic functionalities and non-ionic functionalities.

It would thus be desirable to find alternative routes for manufacturing (per)fluoroelastomers in a convenient and cost-effective way through fast reaction rates using equipments commonly used in the aqueous polymerization of fluorinated monomers with traditional fluorinated surfactants.

BRIEF DESCRIPTION OF THE DRAWINGS

FIG. 1 is a graph depicting the TGA isothermal scan which was carried out under vacuum on compound having formula (X) (X$_a$=NH$_4$) at 150° C. and 180° C.

DISCLOSURE OF INVENTION

It is thus an object of the present invention a process for manufacturing a (per)fluoroelastomer having a heat of fusion of less than 5 J/g as measured by ASTM D-3418-08, said process comprising polymerizing at least one fluorinated monomer in the presence of at least one initiator in a polymerization medium comprising:
(A) water;
(B) at least one fluorinated surfactant [surfactant (FS)] having formula (I) here below:

(I)

wherein:
X$_1$, X$_2$ and X$_3$, equal to or different from each other, are independently selected from H, F and C$_1$-C$_6$ (per)fluoroalkyl groups, optionally comprising one or more catenary or non-catenary oxygen atoms,
R$_F$ represents a divalent perfluorinated C$_1$-C$_3$ bridging group,
L represents a bond or a divalent group and
Y represents a hydrophilic functionality selected from anionic functionalities, cationic functionalities and non-ionic functionalities; and
(C) at least one fluorinated compound [compound (F)] different from surfactant (FS);
wherein said polymerization medium has a pH value of less than 7.

The Applicant has surprisingly found that by means of the process of the invention it is advantageously possible to successfully obtain with high reaction rates nano-sized (per)fluoroelastomer dispersed particles while also significantly lowering toxicological and environmental impact of traditional perfluorocarboxylate surfactants.

The polymerization process of the invention is preferably an aqueous emulsion polymerization process advantageously yielding homogeneously dispersed nano-sized droplets in a kinetically stable, optically transparent, isotropic aqueous dispersion, at room temperature, stabilized by an interfacial film of fluorinated surfactant molecules [surfactant (FS)].

The fluorinated monomer of the process of the invention is typically a gaseous fluorinated monomer. By "gaseous fluorinated monomer" it is meant a monomer which is present as a gas under the polymerization conditions.

Nevertheless, liquid fluorinated monomers under the polymerization conditions may also be used in the polymerization process of the present invention.

Non-limitative examples of suitable fluorinated monomers include, notably, the followings:

(a) $C_2$-$C_8$ perfluoroolefins like, e.g., tetrafluoroethylene (TFE), hexafluoropropene (HFP) and hexafluoroisobutene;

(b) $C_2$-$C_8$ hydrogenated fluoroolefins like, e.g., vinylidene fluoride (VDF) and vinyl fluoride;

(c) $C_2$-$C_8$ chloro- and/or bromo- and/or iodo-fluoroolefins like, e.g., chlorotrifluoroethylene (CTFE);

(d) (per)fluoroalkyl vinyl ethers (PAVE) of formula $CF_2=CFOR_f$, wherein $R_f$ is a $C_1$-$C_6$ (per)fluoroalkyl group, like, e.g., a —$CF_3$, a —$C_2F_5$ or a —$C_3F_7$ perfluoroalkyl group;

(e) (per)fluorooxyalkyl vinyl ethers of formula $CF_2=CFOX$, wherein X is a $C_1$-$C_{12}$ (per)fluorooxyalkyl group containing one or more ether groups, like, e.g., perfluoro-2-propoxypropyl group;

(f) (per)fluorodioxoles of formula:

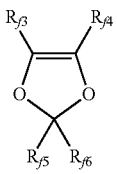

wherein $R_{f3}$, $R_{f4}$, $R_{f5}$ and $R_{f6}$, equal to or different from each other, are independently selected from a fluorine atom or a $C_1$-$C_6$ (per)fluoroalkyl group optionally comprising one or more oxygen atoms, preferably a —$CF_3$, a —$C_2F_5$, a —$C_3F_7$, a —$OCF_3$ or a —$OCF_2CF_2OCF_3$ group;

(g) (per)fluoromethoxyvinyl ethers (MOVEs) having general formula $CFX_2=CX_2OCF_2OR''_f$, wherein $R''_f$ is selected from linear and branched $C_1$-$C_6$ (per)fluoroalkyl groups, cyclic $C_5$-$C_6$ (per)fluoroalkyl groups and linear or branched $C_2$-$C_6$ (per)fluorooxyalkyl groups, containing from one to three oxygen atoms, and $X_2$ is F or H; preferably, $X_2$ is F and $R''_f$ is a —$CF_2CF_3$ group (MOVE1), a —$CF_2CF_2OCF_3$ group (MOVE2) or a —$CF_3$ group (MOVE3);

(h) perfluorovinyl ethers containing cyanide groups notably disclosed in U.S. Pat. No. 4,281,092 (E. I. DU PONT DE NEMOURS AND CO.) Jul. 28, 1981, U.S. Pat. No. 5,447,993 (E. I. DU PONT DE NEMOURS AND CO.) Sep. 5, 1995 and U.S. Pat. No. 5,789,489 (E. I. DU PONT DE NEMOURS AND CO.) Aug. 4, 1998.

The polymerization may further involve non-fluorinated monomers like, e.g., $C_2$-$C_8$ hydrogenated olefins.

Still further, the polymerization may involve co-monomers having at least one functional group like, e.g., a group capable of participating in a peroxide cure reaction. Such functional groups include, notably, halogen atoms like, e.g., bromine or iodine atoms as well as nitrile groups.

According to an embodiment of the invention, the polymerization medium is fed into a reactor system prior to addition thereto of at least one fluorinated monomer and at least one initiator.

The hydrophilic functionality Y of the fluorinated surfactant [surfactant (FS)] can be notably selected from non-ionic functionalities of formula —$(OR_H)_n$—OH, wherein $R_H$ is a divalent hydrocarbon group and n is an integer of 1 to 15.

As an alternative, the hydrophilic functionality Y of the surfactant (FS) can be notably selected from cationic functionalities of formulae:

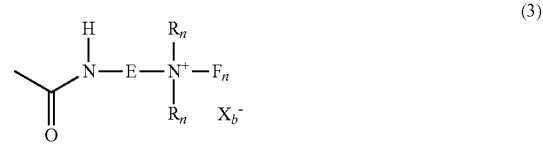

wherein $R_n$, equal or different at each occurrence, is a hydrogen atom or a $C_1$-$C_6$ hydrocarbon group, E is a $C_1$-$C_3$ divalent hydrocarbon group and X $b^-$ is an anion selected from $OH^-$, $Cl^-$, $Br^-$, $I^-$.

The hydrophilic functionality Y of the surfactant (FS) is preferably selected from anionic functionalities of formulae:

wherein $X_a$ is a hydrogen atom, a monovalent metal, preferably an alkaline metal, or an ammonium group of formula —$(R'_n)_4$, wherein $R'_n$, equal or different at each occurrence, is a hydrogen atom or a $C_1$-$C_6$ hydrocarbon group.

The hydrophilic functionality Y of the surfactant (FS) is more preferably a carboxylate of formula (3') as described above.

According to a first embodiment of the invention, the surfactant (FS) complies with formula (II) here below:

wherein $X_1$, $X_2$, $X_3$, $R_F$ and Y have the same meaning as defined above.

The surfactant (FS) of this first embodiment preferably complies with formula (III) here below:

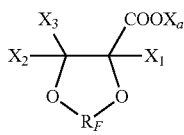

(III)

wherein $X_1$, $X_2$, $X_3$, $R_F$ and $X_a$ have the same meaning as defined above.

According to a first variant of this first embodiment, the surfactant (FS) complies with formula (IV) here below:

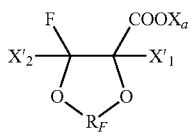

(IV)

wherein $X'_1$ and $X'_2$, equal to or different from each other, are independently a fluorine atom, a —$R'_f$ group or a —$OR'_f$ group, wherein $R'_f$ is a $C_1$-$C_3$ perfluoroalkyl group, preferably with the proviso that at least one of $X'_1$ and $X'_2$ is different from fluorine, and $R_F$ and $X_a$ have the same meanings as defined above.

Compounds of formula (IV) as described above can be notably manufactured as detailed in co-pending European Patent Applications No 08159936.7 and 08168221.3.

The surfactant (FS) having formula (IV) of the first variant of this first embodiment preferably complies with formula (V) here below:

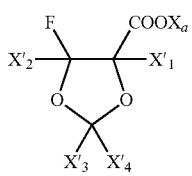

(V)

wherein $X'_1$, $X'_2$, $X'_3$ and $X'_4$, equal to or different from each other, are independently a fluorine atom, a —$R'_f$ group or a —$OR'_f$ group, wherein $R'_f$ is a $C_1$-$C_3$ perfluoroalkyl group.

Non limitative examples of surfactants (FS) having formula (V) as described above include, notably, the followings:

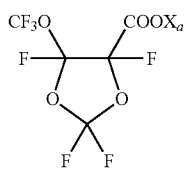

(Va)

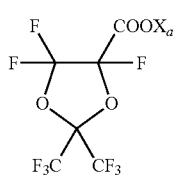

(Vb)

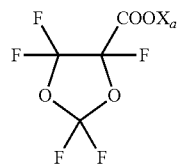

(Vc)

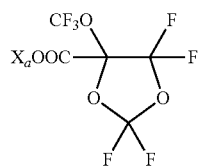

(Vd)

According to a second variant of this first embodiment, the surfactant (FS) complies with formula (VI) here below:

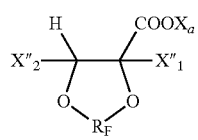

(VI)

wherein $X''_1$ and $X''_2$, equal to or different from each other, are independently a fluorine atom, a —$R'_f$ group or a —$OR'_f$ group, wherein $R'_f$ is a $C_1$-$C_3$ perfluoroalkyl group, and $R_F$ and $X_a$ have the same meanings as defined above.

Compounds of formula (VI) as described above can be notably manufactured as detailed in co-pending European Patent Applications No 08159936.7 and 08168221.3.

The surfactant (FS) having formula (VI) of the second variant of this first embodiment preferably complies with formula (VII) here below:

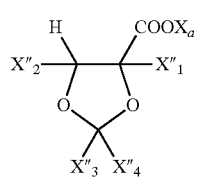

(VII)

wherein $X''_1$, $X''_2$, $X''_3$ and $X''_4$, equal to or different from each other, are independently a fluorine atom, a —$R'_f$ group or a —$OR'_f$ group, wherein $R'_f$ is a $C_1$-$C_3$ perfluoroalkyl group.

Non limitative examples of surfactants (FS) having formula (VII) as described above include, notably, the followings:

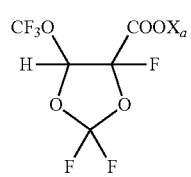

(VIIa)

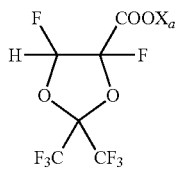

(VIIb)

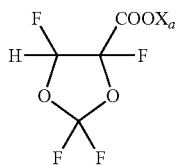

(VIIc)

According to a second preferred embodiment of the invention, the surfactant (FS) complies with formula (VIII) here below:

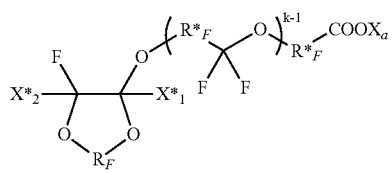

(VIII)

wherein $R_F$ and $X_a$ have the same meanings as defined above, $X^*_1$ and $X^*_2$, equal to or different from each other, are independently a fluorine atom, a —$R'_f$ group or a —$OR'_f$ group, wherein $R'_f$ is a $C_1$-$C_3$ perfluoroalkyl group, $R^*_F$ is a divalent fluorinated group and k is an integer from 1 to 3.

Compounds of formula (VIII) as described above can be notably manufactured as detailed in co-pending European Patent Applications No 08159936.7 and 08168221.3.

The surfactant (FS) of this second preferred embodiment preferably complies with formula (IX) here below:

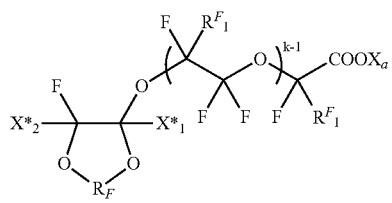

(IX)

wherein $R^F$ and $X_a$ have the same meanings as defined above, $X^*_1$ and $X^*_2$, equal to or different from each other, are independently a fluorine atom, a —$R'_f$ group or a —$OR'_f$ group, wherein $R'_f$ is a $C_1$-$C_3$ perfluoroalkyl group, $R^F_1$ is a fluorine atom or a —$CF_3$ group and k is an integer from 1 to 3.

Compounds of formula (IX) as described above can be notably manufactured as detailed in co-pending European Patent Applications No 08159936.7 and 08168221.3.

Among these compounds, surfactants (FS) having formulae (X) and (XI) here below:

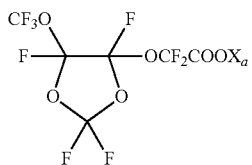

(X)

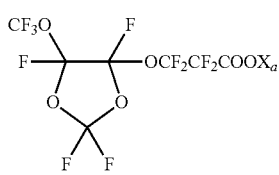

(XI)

wherein $X_a$ has the same meaning as defined above, have been found useful in the process of the invention.

In particular, surfactants (FS) having formula (X) as described above have been found very useful in the process of the invention.

A mixture of more than one surfactant (FS) having formula (I) as described above may also be used in the polymerization medium of the process of the invention.

The total amount of surfactant(s) (FS) having formula (I) as described above used in the process of the invention typically ranges between 0.001% by weight and 5% by weight, preferably between 0.05% by weight and 1% by weight with respect to the total weight of water in the polymerization process.

The fluorinated compound [compound (F)] is typically a fluorinated fluid, that is to say it is a compound which is advantageously in the liquid state in the polymerization conditions.

The compound (F) is typically free from polymerizable ethylenic unsaturation; in other words, the compound (F) is notably distinguishable from fluorinated monomer(s), as above detailed.

Further, it is understood that compound (F) is different from surfactant (FS), as above described.

Non-limitative examples of suitable fluorinated fluids include, notably, (per)fluoroalkanes, (per)fluoroethers and (per)fluoropolyethers comprising at least one (per)fluoropolyoxyalkylene chain [chain ($R_F$)], these latters being preferred.

The (per)fluoropolyoxyalkylene chain [chain ($R_F$)] of the fluorinated fluid typically comprises one or more recurring units R' having general formula —$(CF_2)_j$—CFZO—, wherein Z is selected from a fluorine atom and a $C_1$-$C_5$ (per)fluoro(oxy)alkyl group and j is an integer comprised between 0 and 3, the recurring units being generally statistically distributed along the (per)fluoropolyoxyalkylene chain.

The compound (F) is preferably a functional (per)fluoropolyether (functional PFPE) comprising at least one (per)fluoropolyoxyalkylene chain [chain ($R_F$)] as defined above and at least one functional end-group selected from carboxylic acid, phosphonic acid and sulphonic acid groups.

The compound (F) more preferably complies with formula (XII) here below:

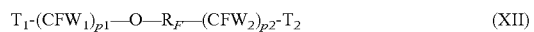

(XII)

wherein:

$R_F$ is a (per)fluoropolyoxyalkylene chain [chain ($R_F$)] as defined above;

$T_1$ and $T_2$, equal to or different from each other, are selected from:

i) functional end-groups selected from carboxylic acid, phosphonic acid and sulphonic acid groups, and ii) non-functional end-groups selected from a fluorine atom, a chlorine atom and a $C_1$-$C_3$ (per)fluoroalkyl group comprising, optionally, one or more chlorine atoms, with the proviso that at least one of $T_1$ and $T_2$ is a functional end-group as defined above;

$W_1$ and $W_2$, equal to or different from each other, independently represent a fluorine atom or a —$CF_3$ group;

$p_1$ and $p_2$, equal to or different from each other, are independently integers comprised between 1 and 3, preferably being equal to 1 when $W_1$ and/or $W_2$ are —$CF_3$ groups.

The compound (F) most preferably complies with formula (XII) as described above wherein both $T_1$ and $T_2$ are functional end-groups as defined above (bifunctional PFPE).

Non-limitative examples of suitable bifunctional PFPEs include, notably, those complying with formula (XIII) here below:

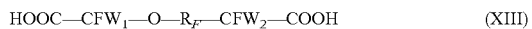

HOOC—$CFW_1$—O—$R_F$—$CFW_2$—COOH        (XIII)

wherein:

$R_F$ is a (per)fluoropolyoxyalkylene chain [chain ($R_F$)] as defined above;

$W_1$ and $W_2$, equal to or different from each other, have the same meaning as defined above.

The compound (F) even most preferably complies with formula (XIV) here below:

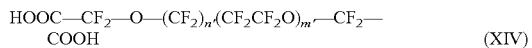

HOOC—$CF_2$—O—$(CF_2)_{n'}(CF_2CF_2O)_{m'}$—$CF_2$—COOH        (XIV)

wherein n' and m' are independently integers>0 such that the number average molecular weight of the bifunctional PFPE is at least 1000, preferably at least 1300, more preferably at least 1500, the recurring units being generally statistically distributed along the perfluoropolyoxyalkylene chain.

A mixture of more than one compound (F) as defined above may also be used in the polymerization medium of the process of the invention.

The polymerization medium of the process of the invention has a pH value of preferably less than 5, more preferably less than 4, even more preferably less than 3.

The Applicant has surprisingly found that a polymerization medium as defined above having a pH value of more than 7 is not suitable for yielding nano-sized (per)fluoroelastomer dispersed particles with high reaction rates.

The polymerization process of the invention is carried out at temperatures typically ranging between 25° C. and 200° C., preferably between 40° C. and 150° C.

The polymerization process is carried out at pressures typically ranging between 2 and 50 bar, preferably between 5 and 45 bar.

The polymerization process of the invention is started by at least one initiator. Suitable initiators include any of the initiators known for initiating a free radical polymerization of one or more fluorinated monomers.

The initiator is preferably selected from inorganic initiators and peroxide initiators.

Non-limitative examples of suitable inorganic initiators include, notably, ammonium-, alkali- or earth alkali-salts of persulfates or (per)manganic acids. A persulfate initiator, e.g. ammonium persulfate, can be used on its own or may be used in combination with a reducing agent. Suitable reducing agents include bisulfites such as, e.g., ammonium bisulfite or sodium metabisulfite, thiosulfates such as, e.g., ammonium, potassium or sodium thiosulfate, hydrazines, azodicarboxylates and azodicarboxyldiamide. Further reducing agents which may be used include sodium formaldehyde sulfoxylate (Rongalite) or fluoroalkyl sulfinates as disclosed in U.S. Pat. No. 5,285,002 (MINNESOTA MINING AND MANUFACTURING CO.) Feb. 8, 1994. The reducing agent typically reduces the half-life time of the persulfate initiator. Additionally, a metal salt catalyst such as, e.g., copper, iron or silver salts may be added.

Non-limitative examples of suitable peroxide initiators include, notably, hydrogen peroxide, sodium or barium peroxide, diacylperoxides such as, e.g., diacetylperoxide, disuccinyl peroxide, dipropionylperoxide, dibutyrylperoxide, dibenzoylperoxide, di-tert-butylperoxide, benzoylacetylperoxide, diglutaric acid peroxide and dilaurylperoxide, and further per-acids and salts thereof such as, e.g., ammonium, sodium or potassium salts. Specific examples of per-acids include, notably, peracetic acid. Esters of the peracid can be used as well and examples thereof include tert-butylperoxyacetate and tert-butylperoxypivalate.

The amount of initiator typically ranges between 0.01% and 1% by weight, preferably between 0.02% and 0.5% by weight with respect to the weight of (per)fluoroelastomer solids to be produced.

The polymerization process of the invention typically results in a latex of a (per)fluoroelastomer in water, said (per)fluoroelastomer having a heat of fusion of less than 5 J/g, as measured by ASTM D-3418-08, said latex further comprising at least one surfactant (FS) having formula (I) as described above and at least one compound (F) different from said surfactant (FS).

The (per)fluoroelastomer has a heat of fusion of preferably less than 3 J/g, more preferably less than 2 J/g, as measured by ASTM D-3418-08.

The amount of (per)fluoroelastomer as defined above in the latex directly resulting from the polymerization process typically ranges between 5% and 50% by weight, preferably between 10% and 40% by weight.

The (per)fluoroelastomer as defined above is dispersed in the latex under the form of particles having an average size of preferably less than 100 nm, more preferably less than 95 nm, even more preferably less than 90 nm, as measured according to ISO 13321.

The (per)fluoroelastomer as defined above is dispersed in the latex under the form of particles having an average size of preferably more than 1 nm, more preferably more than 3 nm, even more preferably more than 5 nm, as measured according to ISO 13321.

The total amount of surfactant(s) (FS) having formula (I) as described above in the latex directly resulting from the polymerization process typically ranges between 0.001% and 5% by weight, preferably between 0.01% and 2% by weight with respect to the weight of (per)fluoroelastomer in the latex.

A (per)fluoroelastomer composition comprising at least one fluorinated surfactant (FS) having formula (I) as described above may be isolated from the latex by coagulation if a polymer in solid form is desired.

Coagulation is typically carried out by adding suitable electrolytes or acids.

Non-limitative examples of suitable electrolytes include, notably, $Al(NO_3)_3$, $Al_2(SO_4)_3$, $MgSO_4$, $MgCl_2$, $Ca(NO_3)_2$, $Zn(NO_3)_2$, $ZnSO_4$, $CaCl_2$, $(NH_4)_2SO_4$, $NH_4NO_3$, $Na_2SO_4$, $NaHSO_4$. Non-(imitative examples of suitable acids include, notably, $HNO_3$, HCl, $H_2SO_4$, $H_3PO_4$, citric acid.

Coagulation is preferably carried out by adding electrolytes selected from $Al(NO_3)_3$, $Al_2(SO_4)_3$, $MgSO_4$ and $MgCl_2$ or acids selected from $HNO_3$, HCl and $H_2SO_4$.

Coagulation is more preferably carried out by adding $HNO_3$.

The (per)fluoroelastomers obtained by the present invention typically belong to the following classes:

(1) VDF-based copolymers, in which VDF is copolymerized with at least one co-monomer selected from fluorinated monomers (a), (c), (d), (e), (f), (g) as described above and non-fluorinated monomers here below: (i) $C_2$-$C_8$ hydrogenated olefins like, e.g., ethylene (E) and propylene (P);

(2) TFE-based copolymers, in which TFE is copolymerized with at least one co-monomer selected from fluorinated monomers (c), (d), (e), (g), (h) as described above and non-fluorinated monomers (i) as described above.

Within the classes defined above, the mole composition of the (per)fluoroelastomer is preferably selected from the following, 100% being the sum of the mole percentages of the monomers:

(a') vinylidene fluoride (VDF) 35-85%, hexafluoropropene (HFP) 10-45%, tetrafluoroethylene (TFE) 0-30%, perfluoroalkyl vinyl ether (PAVE) 0-15%, (b') vinylidene fluoride (VDF) 50-80%, perfluoroalkyl vinyl ether (PAVE) 5-50%, tetrafluoroethylene (TFE) 0-30%, (c') vinylidene fluoride (VDF) 20-30%, $C_2$-$C_8$ non-fluorinated olefins (Ol) 10-30%, hexafluoropropene (HFP) and/or perfluoroalkyl vinyl ether (PAVE) 18-27%, tetrafluoroethylene (TFE) 10-30%, (d') tetrafluoroethylene (TFE) 45-65%, $C_2$-$C_8$ non-fluorinated olefins (Ol) 20-55%, vinylidene fluoride 0-30%, (e') tetrafluoroethylene (TFE) 32-60 mol %, $C_2$-$C_8$ non-fluorinated olefins (Ol) 10-40%, perfluoroalkyl vinyl ether (PAVE) 20-40%, (per)fluoromethoxyvinyl ether (MOVE) 0-30%, (f') tetrafluoroethylene (TFE) 33-75%, perfluoroalkyl vinyl ether (PAVE) 15-45%, vinylidene fluoride (VDF) 5-30%, hexafluoropropene HFP 0-30%, (g') vinylidene fluoride (VDF) 35-85%, (per)fluoromethoxyvinyl ether (MOVE) 5-40%, perfluoroalkyl vinyl ether (PAVE) 0-30%, tetrafluoroethylene (TFE) 0-40%, hexafluoropropene (HFP) 0-30%, (h') tetrafluoroethylene (TFE) 50-80%, perfluoroalkyl vinyl ether (PAVE) 20-50%, (i') tetrafluoroethylene (TFE) 45-65%, $C_2$-$C_8$ non-fluorinated olefins (Ol) 20-55%, vinylidene fluoride 0-30%, (j') tetrafluoroethylene (TFE) 32-60%, $C_2$-$C_8$ non-fluorinated olefins (Ol) 10-40%, perfluoroalkyl vinyl ether (PAVE) 20-40%, (k') tetrafluoroethylene (TFE) 33-75%, perfluoroalkyl vinyl ether (PAVE) 15-45%, vinylidene fluoride (VDF) 5-30%, (l') tetrafluoroethylene (TFE) 33-75%, perfluoroalkyl vinyl ether (PAVE) 0-45%, MOVE 15-30%, HFP 0-30%.

Optionally, the (per)fluoroelastomers also comprise recurring units derived from a bis-olefin of general formula:

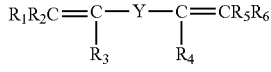

wherein $R_1$, $R_2$, $R_3$, $R_4$, $R_5$ and $R_6$, equal to or different from each other, are independently selected from H and $C_1$-$C_5$ alkyl groups and Y is a linear or branched $C_1$-$C_{18}$ alkylene or cycloalkylene radical, optionally containing oxygen atoms, preferably at least partially fluorinated, or a (per)fluoropolyoxyalkylene radical.

The amount of chain units derived from these bis-olefins is typically between 0.01% and 1.0% by moles, preferably between 0.03% and 0.5% by moles and even more preferably between 0.05% and 0.2% by moles, 100% being the sum of the mole percentages of the other recurring units.

Another object of the present invention is a (per)fluoroelastomer composition comprising less than 2000 ppm of at least one fluorinated surfactant (FS) having formula (I) as described above, wherein the (per)fluoroelastomer has a heat of fusion of less than 5 J/g as measured by ASTM D-3418-08.

The Applicant has found that a (per)fluoroelastomer composition as defined above comprising at least one fluorinated surfactant (FS) having formula (I) as described above in an amount of advantageously less than 2000 ppm, preferably less than 1000 ppm, more preferably less than 800 ppm can be successfully obtained by thermal treating the composition resulting from coagulation of the latex as defined above.

The thermal treatment is typically performed in suitable heating devices, generally electric ovens or convection ovens.

The thermal treatment is carried out at temperatures typically up to 300° C., preferably up to 200° C., more preferably up to 100° C. The thermal treatment is carried out for a time of typically from 1 to 30 hours.

Also, another object of the present invention is a cured (per)fluoroelastomer composition comprising less than 2000 ppm of at least one fluorinated surfactant (FS) having formula (I) as described above, wherein the (per)fluoroelastomer has a heat of fusion of less than 5 J/g as measured by ASTM D-3418-08.

Cured (per)fluoroelastomer compositions as defined above may be obtained by ionic, peroxide or mixed ionic/peroxide vulcanization.

In the case of peroxide vulcanization, the (per)fluoroelastomers preferably contain iodine and/or bromine atoms in the chain and/or in the end position of the macromolecules. The introduction of these iodine and/or bromine atoms may be performed by adding to the reaction mixture brominated and/or iodinated cure-site co-monomers, such as bromo-olefins and/or iodo-olefins containing from 2 to 10 carbon atoms as notably described in U.S. Pat. No. 4,035,565 (E. I. DU PONT DE NEMOURS AND CO.) Jul. 12, 1977 and U.S. Pat. No. 4,694,045 (E. I. DU PONT DE NEMOURS AND CO.) Sep. 15, 1987 or iodo- and/or bromo-fluoroalkyl vinyl ethers as notably described in U.S. Pat. No. 4,745,165 (AUSIMONT S.P.A.) May 17, 1988, U.S. Pat. No. 4,564,662 (MINNESOTA MINING AND MANUFACTURING CO.) Jan. 14, 1986 and EP 199138 B (DAIKIN INDUSTRIES LTD.) Feb. 22, 1989 in amounts such that the content of cure-site co-monomers in the final product is generally between 0.05% and 2% by moles, 100% being the sum of the mole percentages of the other recurring units. Other iodinated compounds that may be used are triiodinated triazine derivatives as described in EP 860436 B (SOLVAY SOLEXIS S.P.A.) May 6, 2004.

As an alternative to or in combination with the cure-site co-monomers, it is possible to introduce iodine and/or bromine end atoms by adding to the reaction mixture iodinated and/or brominated chain-transfer agents, for instance compounds of formula $R_f(I)_x(Br)_y$, where $R_f$ is a $C_1$-$C_8$ (per)fluoro(chloro)alkyl group, x and y are independently integers between 0 and 2, the (x+y) sum being comprised between 1 and 2, as notably described in U.S. Pat. No. 4,243,770 (DAIKIN KOGYO CO. LTD.) Jan. 6, 1981 and U.S. Pat. No. 4,943,622 (NIPPON MEKTRON LTD.) Jul. 24, 1990. Further chain-transfer agents which may be used include, notably, alkali metal or alkaline-earth metal iodides and/or bromides as described in U.S. Pat. No. 5,173,553 (AUSIMONT S.R.L.) Dec. 22, 1992 and esters such as, e.g., ethyl acetate, diethyl malonate, etc.

The peroxide-mediated vulcanization is performed according to known techniques, via the addition of a suitable peroxide capable of generating radicals by thermal decomposition. Among the agents most commonly used, mention may be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other peroxide systems are described, for example, in EP 136596 B (AUSIMONT S.P.A) May 11, 1988 and EP 410351 B (AUSIMONT S.P.A.) Dec. 7, 1994.

Other products may be added to the vulcanization blend, such as:

(i) vulcanization coagents, in an amount of typically between 0.5% and 10% by weight, preferably between 1% and 7% by weight with respect to the (per)fluoroelastomer; among these agents, the ones commonly used include, notably, triallyl cyanurate, triallyl isocyanurate (TAIC), tris(diallylamine)-s-triazine as described in EP 860436 B (SOLVAY SOLEXIS S.P.A.) May 6, 2004, triallyl phosphate, N,N-diallylacrylamide, N,N,N',N'-tetraallylmalonamide, trivinyl isocyanurate, 2,4,6-trivinylmethyltrisiloxane, bis-olefins described in EP 769520 B (AUSIMONT S.P.A.) Jul. 3, 2002, TAIC and bis-olefins as described above being particularly preferred;

(ii) optionally, a metallic compound, in an amount of typically between 1% and 15% by weight, preferably between 2% and 10% by weight with respect to the (per)fluoroelastomer, selected from oxides and hydroxides of divalent metals, for instance Mg, Zn, Ca or Pb, optionally combined with a salt of a weak acid, for instance stearates, benzoates, carbonates, oxalates, or phosphites of Ba, Na, K, Pb or Ca;

(iii) optionally, acid acceptors of metal non-oxide type such as 1,8-bis(dimethylamino)naphthalene, octadecylamine, etc. as notably described in EP 708797 B (E. I. DU PONT DE NEMOURS AND CO.) Feb. 4, 1998;

(iv) optionally, other conventional additives, such as thickening fillers, preferably carbon black, semicrystalline fluoropolymers consisting of TFE homopolymers or copolymers of TFE with one or more monomers containing at least one unsaturation of ethylenic type, in an amount of typically between 0.01% by moles and 10% by moles, preferably between 0.05% by moles and 7% by moles, pigments, antioxidants, stabilizers and the like.

When the (per)fluoroelastomer contains cyanide groups, the vulcanization of the (per)fluoroelastomer compositions as defined above is performed using as cross-linking agents organotin compounds or diaromatic amine compounds, as described in U.S. Pat. No. 4,394,489 (E. I. DU PONT DE NEMOURS AND CO.) Jul. 19, 1983, U.S. Pat. No. 5,767,204 (NIPPON MEKTRON LTD.) Jun. 16, 1998 and U.S. Pat. No. 5,789,509 (E. I. DU PONT DE NEMOURS AND CO.) Aug. 4, 1998. This type of vulcanization may be combined with a vulcanization of peroxide type, in the case where the (per) fluoroelastomer contains iodinated and/or brominated end groups, as described in patent U.S. Pat. No. 5,447,993 (E. I. DU PONT DE NEMOURS AND CO.) Sep. 5, 1995.

The ionic vulcanization is advantageously performed by adding vulcanizing agents and accelerators that are well known in the art. The amounts of accelerators are typically between 0.05-5 parts by weight and the amounts of vulcanizing agents are typically between 0.5-15 parts by weight, preferably between 1-6 parts by weight per 100 parts of (per) fluoroelastomer.

Vulcanizing agents which may be used include, notably, aromatic or aliphatic polyoxyhydryl compounds, or derivatives thereof, as described, for example, in EP 335705 B (MINNESOTA MINING AND MANUFACTURING CO.) Jan. 26, 1994 and U.S. Pat. No. 4,233,427 (RHONE-POULENC INDUSTRIES) Nov. 11, 1980. Among these agents, mention may be made in particular of di-, tri- and tetrahydroxy benzenes, naphthalenes or anthracenes, bisphenols, in which the two aromatic rings are bonded together via a divalent aliphatic, cycloaliphatic or aromatic radical, or via an oxygen or sulfur atom, or alternatively a carbonyl group. The aromatic rings may be substituted with one or more chlorine, fluorine or bromine atoms or with carbonyl, alkyl or acyl groups. Bisphenol AF is particularly preferred.

Examples of accelerators which may be used include, notably, quaternary ammonium or phosphonium salts as notably described in EP 335705 B (MINNESOTA MINING AND MANUFACTURING CO.) Jan. 26, 1994 and U.S. Pat. No. 3,876,654 (E. I. DU PONT DE NEMOURS AND CO.) Apr. 8, 1975, aminophosphonium salts as notably described in U.S. Pat. No. 4,259,463 (MONTEDISON S.P.A.) Mar. 31, 1981, phosphoranes as notably described in U.S. Pat. No. 3,752,787 (E. I. DU PONT DE NEMOURS AND CO.) Aug. 14, 1973, imine compounds as notably described in EP 182299 B (ASAHI KASEI KOGYO KABUSHIKI KAISHA) Apr. 3, 1991 and EP 120462 B (MONTEDISON S.P.A.) Sep. 9, 1987, quaternary phosphonium salts and aminophosphonium salts being preferred.

Instead of using the accelerator and the vulcanizing agent separately, it is also possible to use from 1 to 5 phr (preferably 2 to 4.5 phr) of an adduct between an accelerator and a vulcanizing agent in a mole ratio of from 1:2 to 1:5 and preferably from 1:3 to 1:5, the accelerator being one of the organic onium compounds with a positive charge, as defined above, the vulcanizing agent being chosen from the compounds indicated above, in particular di- or polyhydroxy or di- or polythiol compounds; the adduct being obtained by melting the product of reaction between the accelerator and the vulcanizing agent in the indicated mole ratios or by melting the mixture of the 1:1 adduct supplemented with the vulcanizing agent in the indicated amounts. Optionally, an excess of accelerator relative to that contained in the adduct may also be present.

For the preparation of the adduct, the following cations are particularly preferred: 1,1-diphenyl-1-benzyl-N-diethylphosphoranamine and tetrabutylphosphonium; among the anions that are particularly preferred there are bisphenol compounds in which the two aromatic rings are bonded via a divalent radical chosen from the group of perfluoroalkylenes containing from 3 to 7 carbon atoms and the OH groups are in the para position.

The preparation of the adduct is described in EP 684277 B (SOLVAY SOLEXIS S.P.A.) Apr. 26, 2006, which is incorporated herein in its entirety by reference.

The ionic vulcanization compound may also contain:

i*) one or more inorganic-acid acceptors chosen from those known in the ionic vulcanization of vinylidene fluorine copolymers, in amounts of 1-40 parts per 100 parts of (per) fluoroelastomer;

ii*) one or more basic compounds chosen from those known in the ionic vulcanization of vinylidene fluoride copolymers, in amounts of from 0.5 to 10 parts per 100 parts of (per)fluoroelastomer.

The basic compounds referred to in point ii*) are commonly chosen from the group consisting of $Ca(OH)_2$, $Sr(OH)_2$, $Ba(OH)_2$ and metal salts of weak acids, for instance carbonates, benzoates, oxalates and phosphites of Ca, Sr, Ba, Na and K and mixtures of the abovementioned hydroxides with the abovementioned metal salts; among the compounds of the type i*), mention may be made of MgO.

The indicated amounts of the components of the blend are relative to 100 parts by weight of (per)fluoroelastomer.

As stated, other conventional additives, such as thickeners, pigments, antioxidants, stabilizers and the like, may then be added to the vulcanization mixture.

The (per)fluoroelastomer composition as defined above may also be vulcanized via a mixed route combining the two types of vulcanization.

In general, the (per)fluoroelastomers compositions of the invention are molded and simultaneously vulcanized using techniques such as injection-moulding or compression-moulding or, alternatively, by extrusion-moulding.

While temperature at which the vulcanizing-moulding is not particularly limited, temperatures of between about 50° C. and about 250° C. and preferably between about 100° C. and about 200° C. are generally used.

The skilled in the art will thus select the appropriate vulcanization system so as to obtain appropriate curing at the selected temperature. In particular, in case of peroxide-mediated vulcanization, the selection of this vulcanization-moulding temperature will advantageously determine the choice of the peroxide to be used, so as to achieve reasonable vulcanization rate in selected conditions.

After vulcanization-moulding, the vulcanized shaped preformed articles are subjected to a subsequent thermal post-treatment step. This treatment is generally performed in suitable heating devices, generally electric ovens or convection ovens.

The thermal post-treatment is generally performed for a time from at least two minutes to 24 hours, preferably from 30 minutes to 8 hours and more preferably from 1 hour to 8 hours. Longer post-treatment times do not modify the mechanical property values obtained operating for the mentioned times.

In general, the temperature of this post-treatment is greater than 160° C., preferably greater than 190° C. and more preferably greater than 210° C.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

GALDEN® D02 is a PFPE having formula $CF_3O—(CF(CF_3)CF_2O)_n(CF_2O)_m—CF_3$, wherein n and m are integers such that the number average molecular weight is about 740.

FLUOROLINK® C10 is a bifunctional PFPE having formula $HOOC—CF_2O(CF_2CF_2O)_{n'}(CF_2O)_{m'}CF_2—COOH$, wherein n' and m' are integers such that the number average molecular weight is about 1800.

FLUOROLINK® 7800 is a functional PFPE having formula $Cl(C_3F_6O)_n(C_2F_4O)_mCF_2COOH$, wherein n and m are such that the number average molecular weight is about 500.

FLUOROLINK® 7850 is a functional PFPE having formula $Cl(C_3F_6O)_n(C_2F_4O)_mCF_2COOH$, wherein n and m are such that the number average molecular weight is about 600.

Mechanical Stability Test

The latex of (per)fluoroelastomer (300 ml) was introduced in a 1 lt. conical flask and recycled through a peristaltic pump (silicone tube L/S 24 having an internal diameter of 6.4 mm) at a feeding rate of 280 ml/min. The time of recycling was 120 minutes. The percentage loss of solid content was evaluated.

EXAMPLE 1

Manufacture of Polymerization Medium (1)

In a glass flask, equipped with a stirrer, were mixed under stirring 24.00 g of fluorinated surfactant having formula (X) wherein $X_a$ is $NH_4$, 24.00 g of demineralised water and 12.00 g of FLUOROLINK® C10 bifunctional PFPE. The pH was adjusted to about 2.0.

A composition was spontaneously obtained at room temperature which appeared as a limpid, thermodynamically stable solution containing 40.0% by weight of water, 40% by weight of fluorinated surfactant having formula formula (X) wherein $X_a$ is $NH_4$ and 20.0% by weight of FLUOROLINK® C10 bifunctional PFPE [polymerization medium (1)].

The average size of the homogeneously dispersed droplets was found to be 11.7 nm, as measured according to ISO 13321.

EXAMPLE 2

Manufacture of Polymerization Medium (2)

In a glass flask, equipped with a stirrer, were mixed under stirring 18.00 g of fluorinated surfactant having formula (X) wherein $X_a$ is $NH_4$, 30.00 g of demineralised water and 12.00 g of FLUOROLINK® C10 bifunctional PFPE. The pH was adjusted to about 2.3.

A composition was spontaneously obtained at room temperature which appeared as a limpid, thermodynamically stable solution containing 50.0% by weight of water, 30% by weight of fluorinated surfactant having formula formula (X) wherein $X_a$ is $NH_4$ and 20.0% by weight of FLUOROLINK® C10 bifunctional PFPE [polymerization medium (2)].

The average size of the homogeneously dispersed droplets was found to be 16.8 nm, as measured according to ISO 13321.

The polymerization media (1) and (2) of Examples 1 and 2 of the invention could be successfully diluted with water at room temperature to yield a kinetically-stable, optically transparent, isotropic dispersion of nano-sized droplets to be suitably used in the process of the invention.

EXAMPLE 3 (COMPARATIVE)

Same procedures as detailed in Examples 1 and 2 of the invention were followed but the pH value of the compositions so obtained was adjusted to about 8.5.

The so obtained compositions having a pH value of more than 7 were found to lack stability: when diluted, rapid coalescence of droplets towards larger size was observed. As a consequence, these compositions, when used as polymerization media, were found not to be suitable for obtaining nano-sized (per)fluoroelastomer dispersed particles.

EXAMPLE 4

Polymerization of TFE, VDF and HFP

A reactor having an inner volume of 5 lt., equipped with a mechanical stirrer (630 rpm), was charged with 3.5 lt. of demineralised water and 35 ml of the polymerization medium (1) prepared as in Example 1.

The reactor was heated to 80° C. and vented for a few minutes.

The reactor was then pressurized with HFP to a pressure of 8.56 bar and finally pressurized with a feed gas mixture of TFE (11% by moles), VDF (70% by moles) and HFP (19% by moles) to a set-point pressure of 26 bar.

The reactor was then charged with 0.66 ml of 1,4-diiodoperfluorobutane and 0.23 ml of $H_2C{=}CH{-}(CF_2)_6{-}CH{=}CH_2$.

Polymerization was initiated by addition of ammonium persulfate (0.53 g) followed by addition of 1,4-diiodoperfluorobutane (4.13 ml) and of $H_2C{=}CH{-}(CF_2)_6{-}CH{=}CH_2$ (3.38 ml).

Polymerization was pursued until reaching overall monomers consumption of 1500 g after 167 min, then the reactor was depressurized, vented and cooled.

A latex having a solid content of 30.3% by weight was obtained comprising particles having an average size of 57 nm, as measured according to ISO 13321, of a VDF/HFP/TFE copolymer (VDF:HFP:TFE 70.6:17.7:11.7% by moles).

EXAMPLE 5 (COMPARATIVE)

Polymerization of TFE, VDF and HFP

Same procedure as detailed in Example 4 was followed but charging the reactor with 35 ml of a polymerization medium prepared by mixing 51.0% by weight of a 33% by weight aqueous solution of ammonia, 18.0% by weight of GALDEN® D02 PFPE and 31.0% by weight of FLUOROLINK® 7850 fluorinated surfactant, wherein the average size of the homogeneously dispersed droplets was found to be 10 nm, as measured according to ISO 13321, and the pH was adjusted to about 8.5.

Polymerization was pursued until reaching overall monomers consumption of 1500 g after 247 min.

A latex having a solid content of 38.6% by weight was obtained comprising particles having an average size of 76 nm, as measured according to ISO 13321, of a VDF/HFP/TFE copolymer (VDF:HFP:TFE 70.6:17.8:11.6% by moles).

EXAMPLE 6

Polymerization of TFE and Methyl Vinyl Ether (MVE)

Same procedure as detailed in Example 4 was followed but pressurizing the reactor with MVE to a pressure of 8.33 bar and finally pressurized with a feed gas mixture of TFE (60.5% by moles) and MVE (39.5% by moles) to a set-point pressure of 21 bar.

The reactor was then charged with 3.00 ml of 1,4-diiodoperfluorobutane and 0.15 ml of $H_2C{=}CH{-}(CF_2)_6{-}CH{=}CH_2$.

Polymerization was initiated by addition of ammonium persulfate (0.18 g) followed by addition of $H_2C{=}CH{-}(CF_2)_6{-}CH{=}CH_2$ (2.85 ml).

Polymerization was pursued until reaching overall monomers consumption of 1500 g after 165 min.

A latex having a solid content of 30.5% by weight was obtained comprising particles having an average size of 57.1 nm, as measured according to ISO 13321, of a TFE/MVE copolymer (TFE:MVE 66.0:34.0% by moles).

EXAMPLE 7 (COMPARATIVE)

Polymerization of TFE and MVE

Same procedure as detailed in Example 6 was followed but charging the reactor with 35 ml of a polymerization medium prepared by mixing 51.0% by weight of a 33% by weight aqueous solution of ammonia, 18.0% by weight of GALDEN® D02 PFPE and 31.0% by weight of FLUOROLINK® 7850 fluorinated surfactant, wherein the average size of the homogeneously dispersed droplets was found to be 10 nm, as measured according to ISO 13321, and the pH was adjusted to about 8.5.

Polymerization was pursued until reaching overall monomers consumption of 1500 g after 267 min.

A latex having a solid content of 32.9% by weight was obtained comprising particles having an average size of 76 nm, as measured according to ISO 13321, of a TFE/MVE copolymer (TFE:MVE 66.0:34.0% by moles).

Homogeneously dispersed smaller nano-sized (per)fluoroelastomer particles were found to be obtained in Examples 4 and 6 of the invention with higher reaction rates with respect to comparative Examples 5 and 7, wherein the polymerization medium is stabilized by traditional FLUOROLINK® 7850 fluorinated surfactant.

Moreover, recirculation tests showed an improved mechanical stability of the latexes prepared as detailed in Examples 4 and 6 of the invention with respect to latexes prepared as detailed in comparative Examples 5 and 7, while operating in the presence of a polymerization medium stabilized by traditional FLUOROLINK® 7850 fluorinated surfactant (see Table 1 here below).

TABLE 1

| Time [min] | Loss [%] Example 4 | Loss [%] Example 5 | Loss [%] Example 6 | Loss [%] Example 7 |
|---|---|---|---|---|
| 0 | — | — | — | — |
| 15 | 0% | −1% | 0% | 0% |
| 30 | 0% | −1% | 0% | 0% |
| 60 | 0% | −1% | 0% | −1% |
| 90 | 0% | −1% | 0% | −1% |
| 120 | 0% | −2% | 0% | −2% |

EXAMPLE 8

Polymerization of VDF and HFP

A reactor having an inner volume of 21 lt., equipped with a mechanical stirrer (60 rpm), was charged with 13.3 lt. of demineralised water and 116 ml of the polymerization medium (1) prepared as in Example 1.

The reactor was heated to 122° C. and vented for a few minutes.

The reactor was then pressurized with HFP to a pressure of 13.94 bar and finally pressurized with a feed gas mixture of VDF (78.5% by moles) and HFP (21.5% by moles) to a set-point pressure of 38 bar.

Polymerization was initiated by addition of di-tert-butyl peroxide (38.00 ml) followed by addition of ethyl acetate (37.00 ml).

Polymerization was pursued until reaching overall monomers consumption of 7400 g after 594 min.

A latex having a solid content of 34.5% by weight was obtained comprising particles having an average size of 88.9 nm, as measured according to ISO 13321, of a VDF/HFP copolymer (VDF:HFP 21.6:78.4% by moles).

EXAMPLE 9

Polymerization of TFE, VDF and HFP

A reactor having an inner volume of 10 lt., equipped with a mechanical stirrer (545 rpm), was charged with 5.5 lt. of demineralised water and 57 ml of the polymerization medium (2) prepared as in Example 2.

The reactor was heated to 85° C. and vented for a few minutes.

The reactor was then pressurized with HFP to a pressure of 8.91 bar and finally pressurized with a feed gas mixture of TFE (20% by moles), VDF (60% by moles) and HFP (20% by moles) and to a set-point pressure of 20 bar.

Polymerization was initiated by addition of ammonium persulfate (2.48 g) followed by addition of ethyl acetate (57.00 ml).

Polymerization was pursued until reaching overall monomers consumption of 3500 g after 220 min.

A latex having a solid content of 35.4% by weight was obtained comprising particles having an average size of 70.4 nm, as measured according to ISO 13321, of a VDF/HFP/TFE copolymer (VDF:HFP:TFE 60.3:19.6:20.1% by moles).

TGA analyses well demonstrated that compounds having formula (X) ($X_a$=$NH_4$) are more volatile than perfluoroalkanoic acids, possibly via decarboxylation phenomena, and thus are expected to leave lower levels of fluorinated surfactant (FS) residues in (per)fluoroelastomer compositions obtained from latexes comprising the same.

TGA isothermal scans were carried out under vacuum on compound having formula (X) ($X_a$=$NH_4$) at 150° C. and 180° C. These scans are provided in FIG. 1, wherein in abscissa time (in minutes) is given, while other axis provided the % of weight with respect to initial weight. GC coupled with mass spectrometry enabled identifying in cyclic $C_5O_4F_9H$ (i.e. corresponding decarboxylated compound) largely prevailing volatile material detected.

Thermal treatment tests were carried out on fluoroelastomer compositions recovered by coagulation of the latexes prepared as detailed in Examples 8 and 9 of the invention and the amount of residual fluorinated surfactant (FS) in the so obtained fluoroelastomers was measured by GC analyses (see Table 2 here below).

EXAMPLE 10 (COMPARATIVE)

Polymerization of VDF and HFP

Same procedure as detailed in Example 8 was followed but charging the reactor with 116 ml of a polymerization medium prepared by mixing 38.0% by weight of a 8.5% by weight aqueous solution of NaOH, 18.0% by weight of GALDEN® D02 PFPE and 44.0% by weight of FLUOROLINK® 7800 fluorinated surfactant, wherein the average size of the homogeneously dispersed droplets was found to be 10 nm, as measured according to ISO 13321, and the pH was adjusted to about 9.0.

A latex having a solid content of 35.0% by weight was obtained comprising particles having an average size of 115.0 nm, as measured according to ISO 13321, of a VDF/HFP copolymer (VDF:HFP 21.3:78.7% by moles).

TABLE 2

|  | 90° C. (16 hours) | 120° C. (16 hours) | 180° C. (16 hours) |
| --- | --- | --- | --- |
|  | Coagulation from $Al_2(SO_4)_3$ | | |
| Surfactant [ppm] (Example 8) | <25 ppm | <25 ppm | <25 ppm |
|  | Coagulation from $HNO_3$ | | |
|  | <25 ppm | <25 ppm | <25 ppm |
| Surfactant [ppm] | Coagulation from $Al_2(SO_4)_3$ | | |
| (Example 9) | 525 ppm | 153 ppm | <25 ppm |

TABLE 2-continued

|  | 90° C. (16 hours) | 120° C. (16 hours) | 180° C. (16 hours) |
| --- | --- | --- | --- |
|  | Coagulation from $HNO_3$ | | |
| Surfactant [ppm] | 90 ppm | <25 ppm | <25 ppm |
|  | Coagulation from $Al_2(SO_4)_3$ | | |
| (Example 10) | 3330 ppm | 1400 ppm | 340 ppm |
|  | Coagulation from $HNO_3$ | | |
|  | 1990 ppm | 710 ppm | <30 ppm |

Lower fluorinated surfactant residues were detected by GC analyses after thermal treating the fluoroelastomer composition resulting from coagulation of the latex prepared as detailed in Example 8 of the invention as compared with the fluoroelastomer composition resulting from coagulation of the latex prepared as detailed in comparative Example 10 while operating in the presence of a polymerization medium stabilized by traditional FLUOROLINK® 7800 fluorinated surfactant (see Table 2 here above).

The invention claimed is:

1. A process for manufacturing a (per)fluoroelastomer having a heat of fusion of less than 5 J/g as measured by ASTM D-3418-08, said process comprising polymerizing at least one fluorinated monomer in the presence of at least one initiator in a polymerization medium comprising:

(A) water;

(B) at least one fluorinated surfactant [surfactant (FS)] having formula (I) here below:

(I)

wherein:

$X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, $R_F$ represents a divalent perfluorinated $C_1$-$C_3$ bridging group, L represents a bond or a divalent group and Y represents a hydrophilic functionality selected from the group consisting of anionic functionalities, cationic functionalities and non-ionic functionalities; and (C) at least one fluorinated compound [compound (F)] different from surfactant (FS);

wherein said polymerization medium has a pH value of less than 7.

2. The process of claim 1, wherein the hydrophilic functionality Y of the surfactant (FS) is selected from the group consisting of anionic functionalities of formulae:

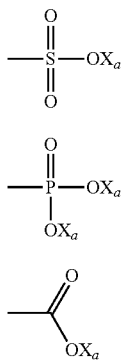

(1')

(2')

(3')

wherein $X_a$ is a hydrogen atom, a monovalent metal, or an ammonium group of formula $—N(R'_n)_4$, wherein $R'_n$, equal or different at each occurrence, is a hydrogen atom or a $C_1$-$C_6$ hydrocarbon group.

3. The process of claim 1, wherein the surfactant (FS) complies with formula (II) here below:

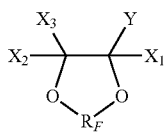

(II)

wherein
$X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms,
$R_F$ represents a divalent perfluorinated $C_1$-$C_3$ bridging group,
Y represents a hydrophilic functionality selected from the group consisting of anionic functionalities, cationic functionalities and non-ionic functionalities.

4. The process of claim 1, wherein the surfactant (FS) complies with formula (VIII) here below:

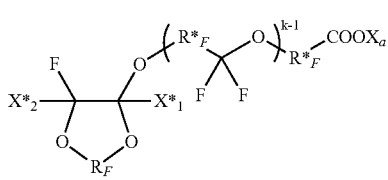

(VIII)

wherein $R_F$ represents a divalent perfluorinated $C_1$-$C_3$ bridging group and $X_a$ is a hydrogen atom, a monovalent metal, or an ammonium group of formula $—N(R'_n)_4$, wherein $R'_n$, equal or different at each occurrence, is a hydrogen atom or a $C_1$-$C_6$ hydrocarbon group, $X^*_1$ and $X^*_2$, equal to or different from each other, are independently a fluorine atom, a $—R'_f$ group or a $—OR'_f$ group, wherein $R'_f$ is a $C_1$-$C_3$ perfluoroalkyl group, $R^*_F$ is a divalent fluorinated group and k is an integer from 1 to 3.

5. The process of claim 1, wherein the surfactant (FS) complies with formula (IX) here below:

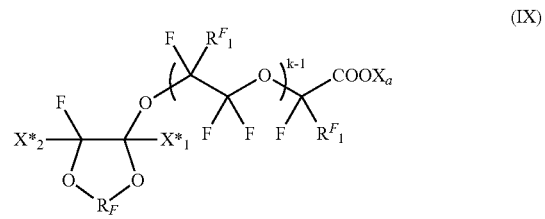

(IX)

wherein $R^F$ has the same meaning as in claim 1 and $X_a$ is a hydrogen atom, a monovalent metal, or an ammonium group of formula $—N(R'_n)_4$, wherein $R'_n$, equal or different at each occurrence, is a hydrogen atom or a $C_1$-$C_6$ hydrocarbon group, $X^*_1$ and $X^*_2$, equal to or different from each other, are independently a fluorine atom, a $—R'_f$ group or a $—OR'_f$ group, wherein $R'_f$ is a $C_1$-$C_3$ perfluoroalkyl group, $R^F_1$ is a fluorine atom or a $—CF_3$ group and k is an integer from 1 to 3.

6. The process of claim 1, wherein the compound (F) is a functional (per)fluoropolyether (functional PFPE) comprising at least one (per)fluoropolyoxyalkylene chain [chain $(R_F)$] and at least one functional end-group selected from the group consisting of carboxylic acid, phosphonic acid and sulphonic acid groups.

7. The process of claim 1 or claim 6, wherein the compound (F) complies with formula (XII) here below:

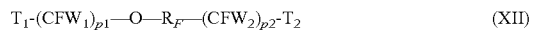

(XII)

wherein:
$R_F$ is a (per)fluoropolyoxyalkylene chain [chain $(R_F)$];
$T_1$ and $T_2$, equal to or different from each other, are selected from the group consisting of:
i) functional end-groups selected from the group consisting of carboxylic acid, phosphonic acid and sulphonic acid groups, and
ii) non-functional end-groups selected from the group consisting of a fluorine atom, a chlorine atom and a $C_1$-$C_3$ (per)fluoroalkyl group comprising, optionally, one or more chlorine atoms, with the proviso that at least one of $T_1$ and $T_2$ is a functional end-group as defined above;
$W_1$ and $W_2$, equal to or different from each other, independently represent a fluorine atom or a $—CF_3$ group;
$p_1$ and $p_2$, equal to or different from each other, are independently integers comprised between 1 and 3.

8. The process of claim 1, wherein the compound (F) complies with formula (XIV) here below:

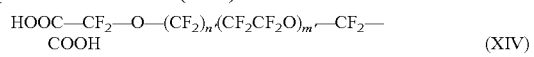

(XIV)

wherein n' and m' are independently integers >0 such that the number average molecular weight of the compound (F) is at least 1000, wherein recurring units of $(CF_2)$ and $(CF_2CF_2O)$ are generally statistically distributed along the perfluoropolyoxyalkylene chain.

9. The process of claim 1, wherein the initiator is selected from the group consisting of inorganic initiators and peroxide initiators.

10. The process of claim 1, wherein the polymerization medium has a pH value of less than 5.

11. The process of claim 1, wherein said polymerization medium has a pH value of less than 3.

* * * * *